United States Patent
Das et al.

(10) Patent No.: US 11,792,840 B2
(45) Date of Patent: Oct. 17, 2023

(54) RELIABLE LOW LATENCY COMMUNICATION OVER SHARED RESOURCES

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Kallol Das, Pijnacker (NL); Ljupco Jorguseski, Rijswijk (NL)

(73) Assignees: Koninklijke KPN N.V., Rotterdam (NL); Nederlandse Organisatie Voor Toegepast-Natuurwetenschappelijk Onderzoek TNO, 'S-Gravenhage (NL)

( * ) Notice: Subject to any disclaimer, the term of this patent is extended or adjusted under 35 U.S.C. 154(b) by 469 days.

(21) Appl. No.: 17/261,831

(22) PCT Filed: Jul. 23, 2019

(86) PCT No.: PCT/EP2019/069728
§ 371 (c)(1),
(2) Date: Jan. 20, 2021

(87) PCT Pub. No.: WO2020/020848
PCT Pub. Date: Jan. 30, 2020

(65) Prior Publication Data
US 2021/0307028 A1  Sep. 30, 2021

(30) Foreign Application Priority Data
Jul. 24, 2018  (EP) ..................................... 18185197

(51) Int. Cl.
*H04W 72/12* (2023.01)
*H04W 72/566* (2023.01)
(Continued)

(52) U.S. Cl.
CPC ..... *H04W 72/569* (2023.01); *H04W 72/0453* (2013.01); *H04W 72/121* (2013.01); *H04W 72/23* (2023.01)

(58) Field of Classification Search
CPC .......... H04W 72/569; H04W 72/0453; H04W 72/121; H04W 72/23
See application file for complete search history.

(56) References Cited

U.S. PATENT DOCUMENTS

| 2003/0133439 A1* | 7/2003 | Huang ................. H04W 99/00 370/465 |
| 2004/0235472 A1 | 11/2004 | Fujishima et al. |

(Continued)

FOREIGN PATENT DOCUMENTS

| WO | WO 2020/020848 A1 | 1/2020 |
| WO | WO 2020/020852 A1 | 1/2020 |

OTHER PUBLICATIONS

Notice of Allowance for U.S. Appl. No. 17/261,817, entitled: Reliable Communication Over Shared Resources, dated Jan. 11, 2023.

(Continued)

*Primary Examiner* — Fahmida S Chowdhury
(74) *Attorney, Agent, or Firm* — Hamilton, Brook, Smith & Reynolds, P.C.

(57) ABSTRACT

A first method comprises transmitting (101) a preamble in a first time interval in a first frequency resource, transmitting (103) a first portion or a first copy of data in the first frequency resource in a second time interval, and transmitting (105) a second portion or second copy of the data in a second frequency resource in the second time interval. The (Continued)

second time interval succeeds the first time interval and the second frequency resource is separate from the first frequency resource. A second method comprises listening (111) for transmission of a preamble, transmitting (115) data in a second time interval succeeding a first time interval upon determining that the preamble was not received in the first time interval, and refraining (113) from transmitting data in the second time interval upon determining that the preamble was received in the first time interval.

15 Claims, 7 Drawing Sheets

(51) Int. Cl.
*H04W 72/0453* (2023.01)
*H04W 72/121* (2023.01)
*H04W 72/23* (2023.01)

(56) References Cited

U.S. PATENT DOCUMENTS

| | | | |
|---|---|---|---|
| 2008/0025334 A1 | 1/2008 | Smith et al. | |
| 2008/0045141 A1* | 2/2008 | Suga | H04W 84/047 455/7 |
| 2008/0049718 A1* | 2/2008 | Chindapol | H04B 7/15592 370/351 |
| 2008/0227386 A1 | 9/2008 | Dayal et al. | |
| 2012/0002597 A1 | 1/2012 | Yang et al. | |
| 2017/0019891 A1* | 1/2017 | Rong | H04L 5/0064 |
| 2017/0111933 A1* | 4/2017 | Wu | H04W 24/08 |
| 2017/0202028 A1* | 7/2017 | Gaal | H04W 74/0833 |
| 2017/0367120 A1* | 12/2017 | Murray | H04W 74/0833 |
| 2018/0199359 A1* | 7/2018 | Cao | H04L 1/1896 |
| 2018/0227805 A1* | 8/2018 | Jang | H04W 28/26 |
| 2018/0302918 A1* | 10/2018 | Shaheen | H04W 76/27 |
| 2019/0090284 A1* | 3/2019 | Kang | H04L 5/0044 |
| 2019/0334659 A1* | 10/2019 | Ye | H04L 1/0061 |
| 2020/0059327 A1* | 2/2020 | Kini | H04L 1/1812 |
| 2020/0120645 A1* | 4/2020 | Park | H04L 5/0082 |
| 2020/0178283 A1* | 6/2020 | Dang | H04W 24/08 |
| 2020/0374912 A1* | 11/2020 | Takeda | H04W 72/0446 |
| 2021/0153205 A1* | 5/2021 | Takeda | H04W 72/23 |
| 2021/0344457 A1 | 11/2021 | Das et al. | |

OTHER PUBLICATIONS

Pocovi, Guillermo et al., "Achieving Ultra-Reliable Low-Latency Communications: Challenges and Envisioned System Enhancements," IEEE Network, 32(2): 8-15 (Mar. 2018).

Popovski, Petar et al., "Wireless Access for Ultra-Reliable Low-Latency Communication (URLLC): Principles and Building Blocks," arxiv.org, Cornell University Library, 201 Olin Library Cornell University Ithaca, NY 14853, Aug. 25, 2017, XP081404888.

Samsung: "Indication of Preempted Resources in DL," 3GPP Draft: R1-1710732—Indication of Preempted Resources in DL, 3rd Generation Partnership Project (3GPP), Mobile Competence Centre, 650, Route Des Lucioles, F-06921, Sophia-Antipolis Cedex, France, vol. RAN WG1, No. Qingdao, P.R. China; Jun. 27, 2017-Jun. 30, 2017, Jun. 26, 2017, XP051299937, Retrieved from the Internet at: URL:http://www.3gpp.org/ftp/Meetings_3GPP_SYNC/RAN1/Docs/ , Retrieved from the Internet on: Jun. 26, 2017.

Sutton, Gordon J. et al., "Enabling Ultra-Reliable and Low-Latency Communications through Unlicensed Spectrum," IEEE Network, IEEE Service Center, New York, NY, vol. 32, No. 2, Mar. 1, 2018, XP011680257.

Institute for Information Industry (III): "Discussion on eMBB and URLLC multiplexing in UL," 3GPP Draft; R1-1700586 Discussion on EMBB and URLLC Multiplexing in UL, 3rd Generation Partnership Project (3GPP), Mobile Competence Centre; 650, Route Des Lucioles, F-06921 Sophia-Antipolis Cedex, France, vol. RAN WG1, No. Spokane, USA; Jan. 16, 2017-Jan. 20, 2017, Jan. 9, 2017, XP051202307, Retrieved from the Internet at: URL:http://www.3gpp.org/ftp/tsg_ran/WG1_RL1/TSGR1_AH/NR_AH_1701/Docs/, Retrieved from the Internet on: Jan. 9, 2017.

PCT International Search Report and Written Opinion for International Application No. PCT/EP2019/069732, entitled Reliable Communication Over Shared Resources, dated Sep. 30, 2019.

PCT International Search Report and Written Opinion for International Application No. PCT/EP2019/069728, entitled: Reliable Low Latency Communication Over Shared Resources, dated Oct. 11, 2019.

ETSI TS 123 401 v12.6.0, LTE; General Packet Radio Sevice (GPRS) enhancements for Evolved Universal Terrestrial Radio Access Network (E-UTRAN) access (3GPP TS 23.401 version 12.6.0 Release 12). (2014).

3GPP TS 23.002 v15.0.0, 3rd Generation Partnership Project; Technical Specification Group Services and System Aspects; Network architecture (Release 15) (2018).

Non-Final Office Action for U.S. Appl. No. 17/261,817, entitled: Reliable Communication Over Shared Resources, dated Jul. 22, 2022.

* cited by examiner

RELIABLE LOW LATENCY COMMUNICATION OVER SHARED RESOURCES This application is the U.S. National Stage of International Application No. PCT/EP2019/069728, filed on Jul. 23, 2019, which designates the U.S., published in English, and claims priority under 35 U.S.C. § 119 or 365(c) to European Application No. 18185197.3, filed on Jul. 24, 2018. The entire teachings of the above applications are incorporated herein by reference.

FIELD OF THE INVENTION

The invention relates to devices for reliable low latency communication.

The invention further relates to methods for reliable low latency communication.

The invention also relates to a computer program product enabling a computer system to perform such methods.

BACKGROUND OF THE INVENTION 5G cellular communication technology aims to support industrial applications among many other vertical industries. One of the key requirements of the industrial application is to provide ultra-reliable low-latency communications (URLLC) between different sensors and actuators in the factory. However, high reliability and low latency are often difficult to achieve simultaneously. High reliability is usually achieved through introducing redundancy in space (e.g. antenna diversity or multiple radio links), time (e.g. repetitions or retransmissions) and code (e.g. source/channel coding) domain, which results in extra latency and overheads in the wireless communication system. Low latency could be achieved by transmitting whenever data is available. However, wireless systems typically use shared radio resources and therefore due to collisions and/or interference the communication reliability cannot be guaranteed.

"Achieving Ultra-Reliable Low Latency Communications: Challenges and Envisioned System Enhancements", G. Pocovi, et.al., IEEE Network, March/April 2018, discloses recent 3GPP improvements for low latency in Release 15 for 5G (NR). These improvements include shorter time slots than 1 ms (e.g. mini time-slots of 0.125 ms), reducing the HARQ round trip time for the retransmissions, pre-emptive resource allocation when multiplexing eMBB and URLLC data. These improvements are addressing the user plane data transfer when the UE is in connected mode and communicating with the gNB.

However, use of the above improvements when there are no dedicated radio resources given to the terminal for uplink transmission does not result in a low latency and high reliability for the high demands of certain industrial applications.

SUMMARY OF THE INVENTION

It is a first object of the invention to provide a device for transmitting a preamble, and data which can be used to provide ultra-reliable low-latency communications to highly demanding applications.

It is a second object of the invention to provide a system for receiving a preamble, which can be used to provide ultra-reliable low-latency communications to highly demanding applications.

It is a third object of the invention to provide a method of transmitting a preamble and data, which can be used to provide ultra-reliable low-latency communications to highly demanding applications.

It is a fourth object of the invention to provide a method of receiving a preamble, which can be used to provide ultra-reliable low-latency communications to highly demanding applications.

According to the invention, the first object is realized in that the device for transmitting a preamble and data comprises at least one transmitter and at least one processor configured to use said at least one transmitter to transmit a preamble in a first time interval in a first frequency resource, use said at least one transmitter to transmit a first portion or a first copy of data in said first frequency resource in a second time interval, said second time interval succeeding said first time interval, and use said at least one transmitter to transmit a second portion or second copy of said data in a second frequency resource in said second time interval, said second frequency resource being separate from said first frequency resource.

The inventors have recognized that device-to-device (D2D) communication has the potential to address the low-latency and high-reliability requirements of certain, e.g. industrial, applications. The low-latency is achieved as the D2D approach allows for direct communications between a group of client devices (UEs) without always going through the base station (e.g. eNB or gNB).

The state of the art D2D communication techniques as currently standardized by 3GPP are not designed to support industrial applications requiring URLLC between the UEs. The inventors have therefore come up with improvements to the currently standardized D2D communication techniques. By using multiple, separate frequency resources to transmit copies or portions of data and by letting client devices transmit an URLLC preamble just before transmitting their URLLC data and letting other devices (e.g. the base station, regular client devices and D2D enabled devices that do not require URLLC data transmission) refrain from transmitting during this time interval, the reliability requirements of highly demanding applications may be met without increasing latency. In contrast, typical time domain packet retransmissions like ARQ and HARQ would increase the latency such that it would no longer meet the latency requirements of highly demanding applications. If the copies or portions are coded, the copy or portion transmitted in the first frequency resource may be coded differently than the copy or portion transmitted in the second frequency resource. The invention may also be used for other communication over shared resources than D2D communication.

Said preamble may indicate that data transmitted in said second time interval requires reliable and urgent reception by a recipient of said data. For example, the preamble may be an URLLC flag and/or may be transmitted in a time slot reserved specifically for URLLC preambles. This may be standardized, e.g. in a 3GPP standard. In an embodiment, said first frequency resource is allocated to device-to-device communication and said second frequency resource is not allocated to device-to-device communication. Currently, UEs in LTE utilize (uplink) frequency resources specifically dedicated/allocated to D2D communication. To achieve reliable and low latency communication, frequency resources not dedicated/allocated to D2D communication may be used.

Said at least one processor may be configured to classify said data in one of a plurality of classes and use said at least one transmitter to transmit said preamble in dependence on said determined class of said data. Although certain devices may be configured to transmit only URLLC data, many devices will have both URLLC data and non-URLLC data and must only transmit the preamble before transmitting URLLC data in order to .achieve the latency and reliability requirements.

Said time intervals may each comprise a first period for transmitting data, a second period for transmitting said preamble following said first period and a guard period following said second period. Thus, the invention may be implemented by using a small portion of the normal transmission time interval (e.g. TTI) for transmitting the preamble. The guard period helps the other devices process the preamble and decide whether to transmit or not in the next transmission time interval. Preferably, said second period consumes 15% or less of said time intervals.

Said preamble may identify said first frequency resource and said second frequency resource. This allows the other devices (receiving the preamble) to still transmit their data in the second time interval in a different frequency resource. The preamble may also identify further frequency resources used by the device to transmit further copies or portions of the data.

Said at least one processor may be configured to use said at least one transmitter to transmit a third copy or third portion of said data in a third frequency resource in said second time interval. It is beneficial to let the amount of duplication, portion splitting and/or coding overhead depend on the network conditions and communications link's reliability requirements. In this case, it may be determined that an additional frequency resource is desired.

Preferably, said preamble consumes 15% or less of said first time interval. This is typically sufficient to communicate the intent to transmit URLLC data and leaves sufficient time to transmit the data (payload) itself. Other systems and/or devices may transmit an URLLC preamble the second, third and/or fourth intervals. In this case, these preambles also preferably consume 15% or less of the corresponding time interval.

Said first frequency resource and/or said third frequency resource may normally be dedicated to transmissions from client devices to base station and said second frequency resource may be normally dedicated to transmissions from base station to client devices. Alternatively, said first frequency resource and said second frequency resource may normally be dedicated to transmissions from client devices to base station. Currently, UEs in LTE utilize only uplink frequency resources for D2D communication between each other. Use of these D2D uplink frequency resources for the URLLC data transmission (which may require duplicate transmission or transmission of data portions) stays close to the current standard, for example. Additional uplink frequency resources, e.g. uplink frequency resources not reserved for D2D communication, may be used for the URLLC transmission(s), but when the base station refrains from transmitting, downlink frequency resources could be used as well.

According to the invention, the second object is realized in that the system for receiving a preamble comprises at least one receiver, at least one transmitter, and at least one processor configured to use said at least one receiver to listen for transmission of a preamble, use said at least one transmitter to transmit data in a second time interval succeeding a first time interval upon determining that said preamble was not received in said first time interval, and refrain from transmitting data in said second time interval upon determining that said preamble was received in said first time interval.

Said preamble may identify said first frequency resource and said second frequency resource and said at least one processor may be configured to refrain from transmitting data in said second time interval in second frequency resource upon determining that said preamble was received in said first time interval. This allows the system to still transmit its data in the second time interval in a different frequency resource. Said at least one processor may further be configured to refrain from transmitting data in said first frequency resource. If the first frequency resource is an uplink resource reserved for D2D communication, then non-D2D devices will not transmit data in the first frequency resource and D2D UEs that do not have URLLC data to be transmitted must refrain from transmitting in the first frequency resource.

Said at least one processor may be configured to use said at least one receiver to receive a message from a base station, said message assigning one or more frequency resources to said system, and use said at least one receiver to listen for transmission of said preamble on at least one of said one or more assigned frequency resources. This is beneficial if the system is another D2D UE, for example. Additional URLLC data transmissions (e.g. duplication or multiple data portions)) may be required in certain situations to meet a particular application's reliability requirements. The base station may assign additional frequency resources to a client device and communicate this assignment to the client device. In a favorable embodiment, this assignment is updated at least every day and may be updated even more frequently if necessary, e.g. after ten minutes. For example, a first pair of frequency resources (e.g. one uplink and one downlink or two uplinks) may be used by a client device for a longer period of time, while other frequency resources are additionally assigned or already assigned frequency resources are released in dependence on network conditions. The UE transmitting the preamble will normally receive a similar message from the base station, assigning one or more frequency resources to it, and frequency resources are shared by multiple UEs.

According to the invention, the third object is realized in that the method of transmitting a preamble comprises transmitting a preamble in a first time interval in a first frequency resource, transmitting a first portion or a first copy of data in said first frequency resource in a second time interval, said second time interval succeeding said first time interval, and transmitting a second portion or second copy of said data in a second frequency resource in said second time interval, said second frequency resource being separate from said first frequency resource.

According to the invention, the fourth object is realized in that the method of receiving a preamble comprises listening for transmission of a preamble, transmitting data in a second time interval succeeding a first time interval upon determining that said preamble was not received in said first time interval, and refraining from transmitting data in said second time interval upon determining that said preamble was received in said first time interval. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: transmitting a preamble in a first time interval in a first frequency resource, transmitting a first portion or a first copy of data in said first frequency resource in a second time interval, said second time interval succeeding said first time interval, and transmitting a second portion or second copy of said data in a second frequency resource in said second time interval, said second frequency resource being separate from said first frequency resource.

A non-transitory computer-readable storage medium stores at least a second software code portion, the second software code portion, when executed or processed by a computer, being configured to perform executable operations comprising: listening for transmission of a preamble, transmitting data in a second time interval succeeding a first time interval upon determining that said preamble was not received in said first time interval, and refraining from transmitting data in said second time interval upon determining that said preamble was received in said first time interval.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
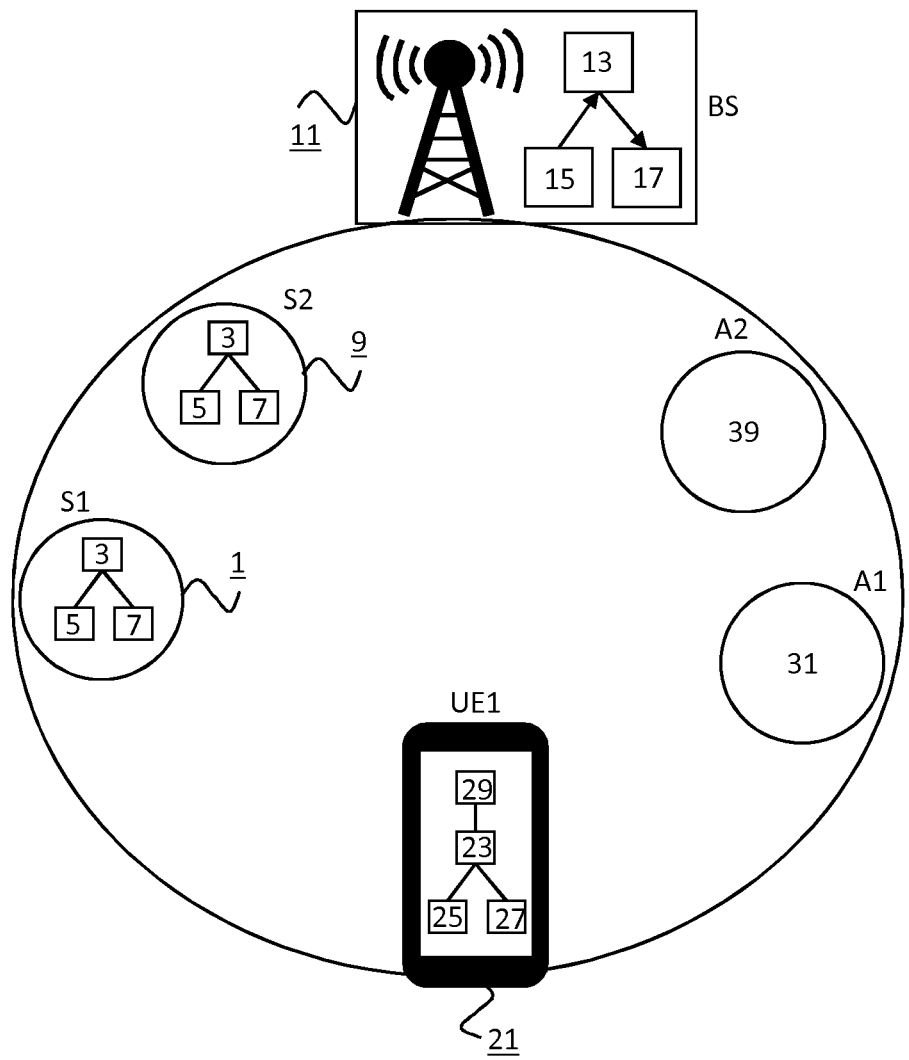
FIG. 1 depicts embodiments of the system and device of the invention.

FIG. 1 depicts embodiments of the system and the device of the invention. A sensor 1 (S1), a sensor 9 (S2), an actuator 31 (A1), an actuator 39 (A2) and a mobile device 21 (UE1) are located in a cell covered by a base station 11, e.g. an eNB or a gNB. The sensors 1 and 9, the actuators 31 and 39, and the mobile device 21 are all referred to as User Equipment (UEs) in most telecommunication standards and in this description. In an example scenario, sensor 1 transmits data to actuator 31, sensor 9 transmits data to actuator 39 and mobile device 21 transmits data to base station 11. In this scenario, the sensors 1 and 9 and the actuators 31 and 39 communicate directly from device to device (D2D).

In this scenario, it is assumed that all UEs requiring D2D communication (including ones transmitting URLLC data) indicate their intention to use D2D communication to the base station 11 and that all the UEs are in coverage and connected with the base station 11. The sensors 1 and 9 comprises a processor 3, a receiver 5, and a transmitter 7. The base station 11 comprises a processor 13, a receiver 15, and a transmitter 17. The mobile device 21 comprises a processor 23, a receiver 25, a transmitter 23, and a memory 29.

In order to achieve low latency communication, the processor 3 of the sensors 1 and 9 is configured to use the transmitter 7 to transmit a preamble in a first time interval and use the transmitter 7 to transmit data in a second time interval succeeding the first time interval. The preamble indicates that data transmitted in the time interval succeeding the first time interval requires reliable reception by a recipient of the data. This data is also referred to as ultra-reliable low latency communication (URLLC) data and this preamble is also referred to as URLLC preamble in this description.

In this embodiment, the processor 3 of the sensors 1 and 9 is further configured to use the receiver 5 to listen for transmission of a preamble, use the transmitter 7 to transmit data in a second time interval succeeding a first time interval upon determining that the preamble was not received in the first time interval, and refrain from transmitting data in the second time interval upon determining that the preamble was received in the first time interval.

This allows the sensor 1 (S1), for example, to transmit URLLC data to the actuator 31 (A1). When the sensor 9 detects the preamble transmitted by the sensor 1 in the first time interval and it has no own URLLC data to transmit, then it refrains from transmitting data in the frequency resource(s) used by sensor 1 (S1). This results in a lower latency for URLLC data.

In this embodiment, the processor 3 of the sensors 1 and 9 is further configured use the transmitter 7 to transmit the preamble in the first time interval in a first frequency resource, use the transmitter 7 to transmit a first portion or a first copy of data in the first frequency resource in the second time interval and use the transmitter 7 to transmit a second portion or second copy of the data in a second frequency resource in the second time interval. The second frequency resource is separate from the first frequency resource. This results in more reliable communication without increasing the latency.

In the embodiment of FIG. 1, the mobile communication network has reserved a set of uplink (UL) resources for D2D packet transmissions, as currently specified in 3GPP for autonomous D2D resource utilization. All the UEs, including sensors 1 and 9 and mobile device 21, are able to listen to these UL resources and the D2D capable UEs, including sensors 1 and 9, are also capable to transmit data (either URLLC or non-URLLC packets) on these UL resources.

As second frequency resource, downlink (DL) resources may be used, for example. In order to achieve low latency reliable communication, the processor 13 of the base station 11 is configured to use the receiver 15 to listen for transmission of a preamble, use the transmitter 17 to transmit data in a second time interval succeeding a first time interval upon determining that the preamble was not received in the first time interval, and refrain from transmitting data in the second time interval upon determining that the preamble was received in the first time interval.

In other words, upon reception of the URLLC preamble in the UL resource by the base station 11, the DL scheduler frees up (associated) DL resources so that the URLLC transmission by the UE (sensor 1 in the above example scenario) can use these additional DL time/frequency resources for the URLLC data transmission. This increases the reliability of the URLLC packet transmission, while not increasing the delay, as the second copy or portion of the data is not transmitted later, but in a different frequency resource.

The mobile device 21 is not communicating directly with other devices and therefore will normally not transmit data in the UL resources reserved for D2D communication. The mobile device 21 will also not transmit data in the DL resources, because these are reserved for communication by the base station 11.

If it might happen that the second frequency resource or a third frequency resource is an UL resource not reserved for D2D communication, then in order to achieve low latency communication, the processor 23 of the mobile device 21 may be configured to use the receiver 25 to listen for transmission of a preamble (in a UL resource reserved for D2D communication), use the transmitter 27 to transmit data in a UL resource not reserved for D2D communication in a second time interval succeeding a first time interval upon determining that the preamble was not received in the first time interval, and refrain from transmitting data in a UL resource not reserved for D2D communication in the second time interval upon determining that the preamble was received in the first time interval.

In the embodiment of FIG. 1, in order to increase the reliability further, the processor 13 of the base station 11 is further configured to use the receiver 15 to listen for transmission of a preamble by a transmitting device (e.g. sensor 1) to a recipient (e.g. actuator 31) and use the receiver to receive data in a second time interval upon receiving the preamble in a first time interval. The second time interval succeeds the first time interval. The processor 13 is further configured to use the receiver 15 to listen for transmission by the recipient of a message indicating that data transmitted in the second time interval was not successfully received by the recipient, e.g. a NACK, and use transmitter 17 to retransmit the data in a fourth time interval upon receiving the message in a third time interval.

Note that the invention is particularly advantageous in cases where traffic cannot be scheduled beforehand, e.g. if a UE has URLLC packets when an event take place (e.g. emergency breakdown, alarms, etc.). As the arrival of URLLC packets is unpredictable, such traffic should not be scheduled beforehand. Even if it could be scheduled by reserving resources, this will not be efficient as most of the time the reserved radio resources are not utilized as there is no actual URLLC traffic in the system. There are other types of URLLC applications in which devices generate periodic traffic that needs to be transmitted with low latency and with high reliability. Such traffic is preferably scheduled either in a regular fashion (by involving the base station) or by utilizing D2D communications with periodic resource reservation.

In the embodiment shown in FIG. 1, the sensors 1 and 9 comprise one processor 3. In an alternative embodiment, one or more of the sensors comprise multiple processors. The receiver 5 and the transmitter 7 of the sensors 1 and 9 may use one or more cellular communication technologies such as GPRS, CDMA, UMTS, LTE, and/or 5G NR to communicate with the actuators 31 and 39 and the base station 19, for example. The receiver 5 and the transmitter 7 may be combined in a transceiver. The processor 3 may be a general-purpose processor, e.g. an ARM processor, or an application-specific processor. The sensors may comprise other components typical for a sensor, e.g. a battery. The sensor may be a motion sensor, for example. The device of the invention may be another device than a sensor, actuator, or a mobile device.

In the embodiment shown in FIG. 1, the base station 11 comprises one processor 13. In an alternative embodiment, the base station 11 comprises multiple processors. The processor 13 of the base station 11 may be a general-purpose processor, e.g. an Intel or an AMD processor, or an application-specific processor, for example. The processor 13 may comprise multiple cores, for example. The processor 13 may run a Unix-based or Windows operating system, for example.

The receiver 15 and the transmitter 17 may use one or more cellular communication technologies such as GPRS, CDMA, UMTS, LTE and/or 5G/NR to communicate with UEs (e.g. mobile device 21, sensors 1 and 9 and actuators 31 and 39), for example. The receiver 15 and the transmitter 17 may be combined in a transceiver. Base station 11 may comprise other components typical for a component in a (e.g. mobile) communication network, e.g. a power supply. In the embodiment shown in FIG. 1, the base station 11 comprises one device. In an alternative embodiment, the base station 11 comprises a plurality of devices. The system of the invention may be another system than a base station or a mobile device.

In the embodiment shown in FIG. 1, the mobile device 21 comprises one processor 23. In an alternative embodiment, the mobile device comprises multiple processors. The receiver 25 and the transmitter 27 of the mobile device 21 may use one or more cellular communication technologies such as GPRS, CDMA, UMTS, LTE, and/or 5G NR to communicate with the base station 11, for example. The receiver 25 and the transmitter 27 may be combined in a transceiver.

The processor 23 may be a general-purpose processor, e.g. an ARM processor, or an application-specific processor. The processor 23 may run Google Android or Apple iOS as operating system, for example. The memory 29 may comprise one or more memory units. The memory 29 may comprise solid state memory, for example. The mobile device may comprise other components typical for a mobile device, e.g. a display and a battery. The mobile device may be a mobile phone, for example. The device of the invention may be another device than a sensor, actuator, or a mobile device.

Figure 2:
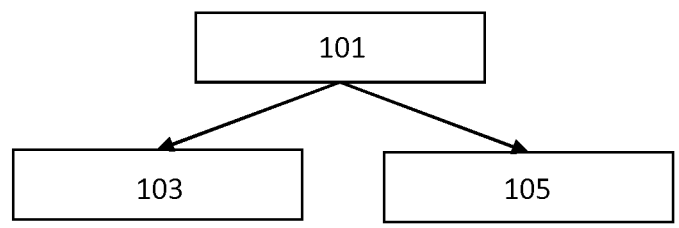
FIG. 2 is a flow diagram of a first embodiment of a first method of the invention.

A first embodiment of a first method of the invention is shown in FIG. 2. A step 101 comprises transmitting a preamble in a first time interval in a first frequency resource. A step 103 comprises transmitting a first portion or a first copy of data in the first frequency resource in a second time interval. The second time interval succeeds the first time interval. A step 105 comprises transmitting a second portion or second copy of the data in a second frequency resource in the second time interval. The second frequency resource is separate from the first frequency resource. In an alternative embodiment, the first method does not comprise step 105 and the data is transmitted in a single frequency resource. In the embodiment of FIG. 2, the preamble indicates that data transmitted in a second time interval succeeding the first time interval requires reliable reception by a recipient of the data.

Figure 3:
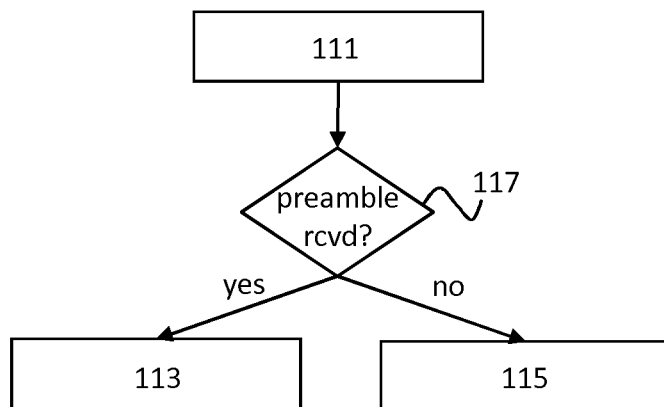
FIG. 3 is a flow diagram of a first embodiment of a second method of the invention.

A first embodiment of a second method of the invention is shown in FIG. 3. A step 111 comprises listening for transmission of a preamble. A step 115 comprises transmitting data in a second time interval succeeding a first time interval upon determining in step 117 that the preamble was not received in the first time interval. A step 113 comprises refraining from transmitting data in the second time interval upon determining in step 117 that the preamble was received in the first time interval.

Figure 4:
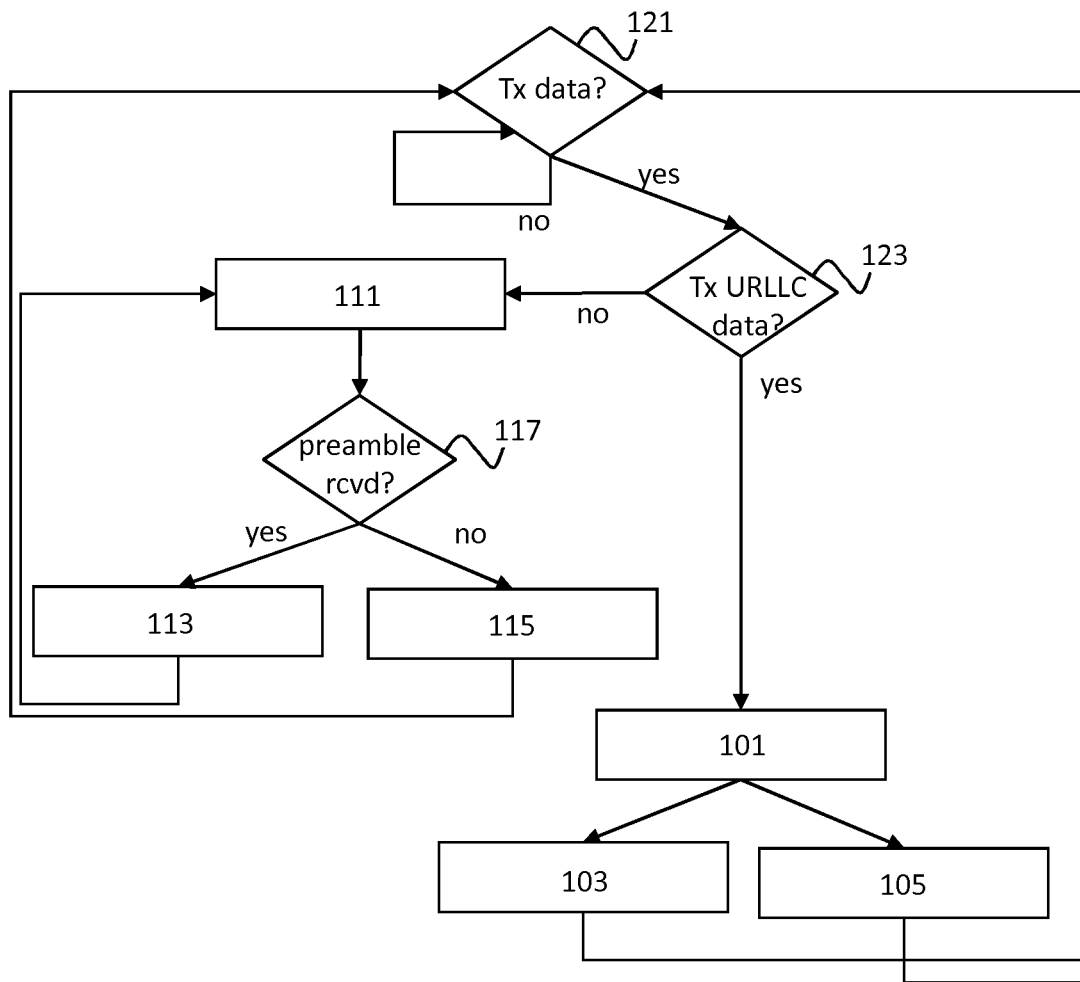
FIG. 4 is a flow diagram of a second embodiment of the first and second methods of the invention.

A second embodiment of the first and second methods is shown in FIG. 4. Typically, an URLLC device performs both the first and second methods. This is shown in FIG. 4. In step 121, it is determined whether the device has any data to be transmitted. If not, step 121 is performed again until the device has data to transmit. In other words, step 121 comprises waiting until the device has data to transmit. If the device has data to be transmitted, step 123 is performed next.

In the embodiment of FIG. 4, data has been classified in one of a plurality of classes. The class of the data to be transmitted is checked in step 123. If the device has URLLC data to be transmitted, then step 101 is performed next. In step 101, the preamble is transmitted. If the device has non-URLLC data to transmit, the URLLC preamble is not transmitted, but step 111 is performed next. In step 111, the device listens for transmission of the URLLC preamble. The steps performed after step 111 are shown in FIG. 3. The steps performed after step 101 are shown in FIG. 2. After the data has been transmitted in step 115 (non-URLLC data) or in steps 103 and 105 (URLLC data), step 121 is performed again. If the device refrained from transmitting, i.e. performed step 113, then step 111 is repeated and the device listens for transmission of the URLLC preamble again to check whether it is now allowed to transmit its non-URLLC data.

Figure 5:
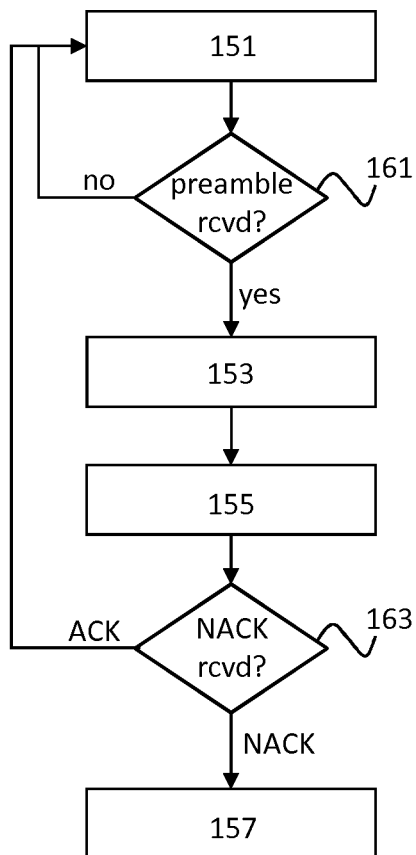
FIG. 5 is a flow diagram of an embodiment of a third method of the invention.

An embodiment of a third method of the invention is shown in FIG. 5. A step 151 comprises listening for transmission of a preamble by a transmitting device to a recipient. If it is determined in step 161 that a preamble has been received, a step 153 is performed next. Step 153 comprises receiving data in a second time interval upon receiving the preamble in a first time interval. The second time interval succeeds the first time interval. A step 155 comprises listening in a third time interval succeeding the second time interval for transmission by the recipient of a message indicating that data transmitted in the second time interval was not successfully received by the recipient. If it is determined in step 163 that a message has been received, a step 157 is performed next. Step 157 comprises retransmitting the data, received in step 153, in a fourth time interval upon receiving the message in a third time interval.

Figure 6:
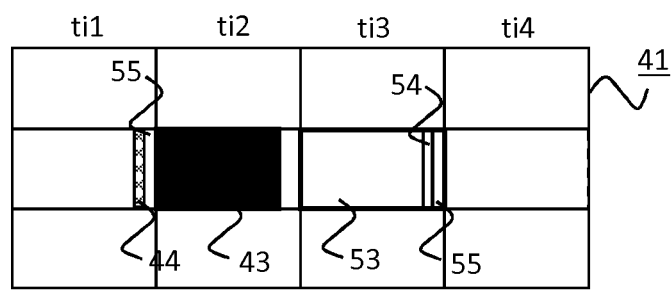
FIG. 6 depicts an example of the first method performing transmissions in certain time intervals and frequency resources.

FIG. 6 depicts an example of the first method performing transmissions in certain time intervals and frequency resources. The preamble 44 is transmitted in step 101 of FIG. 2 in the first time interval ti1. The data 43 is transmitted in step 103 of FIG. 2 in the second time interval ti2 in the same frequency resource as the preamble. The data 43 is transmitted in a period 53 for transmitting data, as shown for time interval ti3. The preamble 44 is transmitted in a period 54 for transmitting the preamble, as shown for time interval ti3. Period 54 follows period 53 and a guard period 55 follows period 54. The guard-period 55 is present to help the base station and other UEs process the information transmitted through the preamble and make a decision about the possible communication scheduled at the next time interval. The preamble preferably consumes 15% or less of the first time interval. In other words, the period 54 preferably consumes 15% or less of the time intervals.

Figure 7:
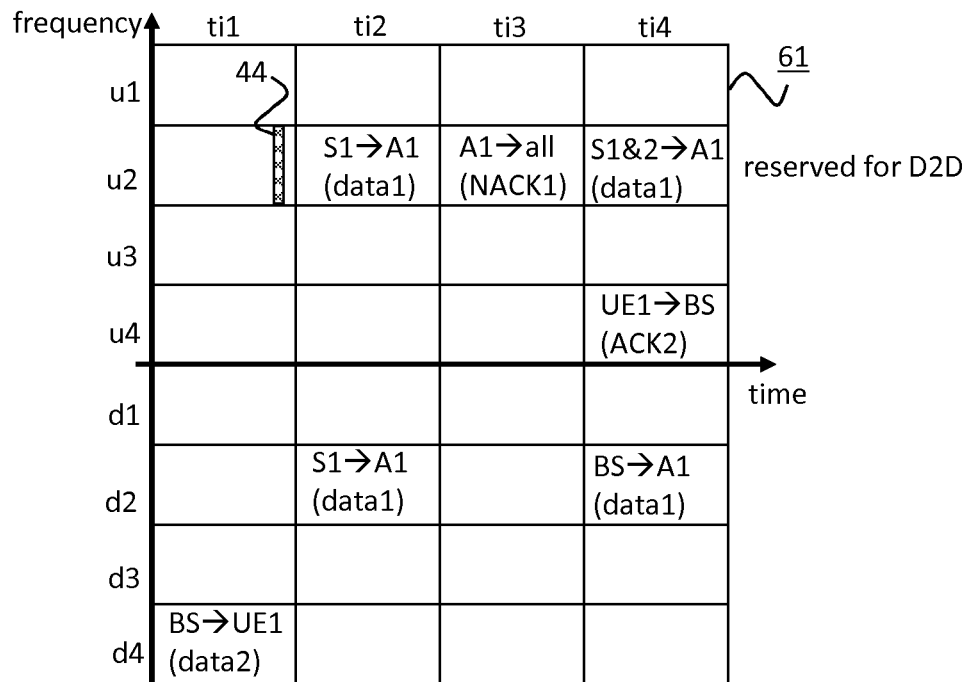
FIG. 7 depicts a first example of the methods of the invention performing transmissions and receptions in certain time intervals and frequency resources.

FIG. 7 depicts in table 61 a first example of the methods of the invention performing transmissions and receptions in certain time intervals and frequency resources. In the example of FIG. 7, sensor S1 (sensor 1 of FIG. 1) transmits URLLC data to actuator A1 (actuator 31 of FIG. 1) in uplink resource u2. Uplink resource u2 is reserved for D2D communication. Before transmitting URLLC data, the sensor S1 transmits a preamble 44, e.g. a flag, in uplink resource u2. This preamble 44 is detected by the base station and by other UEs (the ones that do not require D2D URLLC communication) in close proximity. The preamble 44 indicates that the UE will attempt an URLLC transmission in the next time interval. The preamble 44 is followed directly by a guard period, as shown in FIG. 6. The guard period marks the end of the time interval. The inclusion of the preamble and guard period in the time interval also means that the payload of the URLLC D2D data transmission in the succeeding time interval has to be slightly shorter than the total time interval length in order to have space for transmission of a next URLLC preamble either by the same or other UEs requiring URLLC transmission. This is shown in FIG. 6.

The regular UEs (e.g. UEs for eMMB services) and the D2D UEs with non-URLLC packets first have to listen for transmission of an URLLC preamble before the start of the intended/scheduled time interval. The D2D UEs having non-URLLC packets only transmit in the UL resources reserved for D2D communication if they don't receive a URLLC preamble. The regular UEs (e.g. UEs for eMBB services) refrain from fully using the UL resources assigned by the base station scheduler in the next time interval, as some of these UL resources might be also used by the URLLC transmissions. The UEs with non-URLLC packets will transmit the data (whenever allowed) without transmitting a preamble first, unlike the UEs with URLLC packets.

For improved reliability, a second copy or portion of the URLLC packet is transmitted by the sensor S1 on the 'associated/pre-configured' DL resource d2 in addition to the UL resource u2. The actuator A1 receives/listens to the same UL resource u2 and DL resource d2. The base station will release this DL resource d2 for URLLC transmission after detecting the URLLC preamble 44 transmitted just before the start of the time interval ti2.

In the example of FIG. 7, the UL frequency resource u2 is allocated to device-to-device communication and the DL frequency resource d2 is not allocated to device-to-device communication. In the example of FIG. 7, the first copy or portion of the URLLC packet is transmitted on an UL frequency resource, which is normally dedicated to transmissions from client devices to base station, and the second copy or portion of the URLLC packet is transmitted on a DL frequency resource, which is normally dedicated to transmissions from base station to client devices. In an alternative embodiment, the second copy or portion of the URLLC packet is also transmitted on a frequency resource normally dedicated to transmissions from client devices to base station.

Optionally, the sensor S1 can transmit another copy or portion of the URLLC packet on additional 'associated/pre-configured' UL resource. This is because the regular UEs (e.g. eMBB users) might refrain from fully using allocated UL resources by the base station scheduler upon the reception of the URLLC preamble. This is not shown in FIG. 7. The actuator A1 will listen to both UL resource u2 and DL resource d2 in time interval ti2. Optionally, the actuator A1 will also listen to the additional UL resource (not shown in FIG. 7) that could have been used by regular (e.g. eMBB users) UEs.

In the embodiment illustrated in FIG. 7, different data copies are transmitted on different frequency resources. In an alternative embodiment, different data portions are transmitted on different frequency resources.

In the embodiment illustrated in FIG. 7, The base station is also listening to the UL resource u2 (i.e. the same frequency resource in which the preamble was transmitted) to decode the URLLC packet for (possible) retransmissions in the future in case the actuator A1 fails to receive the packet (data1) and sends a broadcast NACK in UL resource u2. Thus, the data and the NACK are transmitted in a frequency resource normally dedicated to transmission from client devices to base station. In this embodiment, the actuator A1 decides to transmit a broadcast NACK, because it received the preamble 44 in time interval ti1. In an alternative embodiment, actuator A1 decides to transmit a broadcast NACK, because the packet (data1) indicates that data1 is URLLC data. In the example of FIG. 7, the actuator A1 fails to receive the URLLC packet in time interval ti2 and transmits a broadcast NACK in time interval ti3. The base station receives this NACK, but also sensor S1 and sensor S2 receive this NACK.

After the sensors S1 and S2 have received the NACK, the sensors S1 and S2 retransmit the URLLC packet (data1) by using the UL resource u2 in the time interval ti4, as there is no new URLLC packet ready for transmission. In this example, two sensors retransmit the URLLC packet. In practice, how many devices would retransmit an URLLC packet would likely depend on how many devices are nearby and willing to retransmit data for other devices. When multiple devices transmit the same URLLC packet, the URLLC packet may travel over different paths, thereby increasing the probability of the URLLC packet being received correctly by a suitably configured receiver. Retransmission of URLLC packets will get priority over new non-URLLC D2D packets. After the base station has detected the NACK, the base station frees-up the previously scheduled communication in the DL resource d2 of time interval ti4 and uses it for re-transmitting the URLLC packet (data1). Thus, it retransmits the data in a frequency resource normally dedicated to transmissions from base station to client devices. After the actuator A1 has transmitted the NACK, the actuator A1 will start listening in both UL resource u2 and DL resource d2 to receive the URLLC packet retransmitted by the sensor S1 and the base station in time interval ti4.

For non-URLLC D2D traffic, only the pre-configured UL time/frequency resources u2 are used and no preamble is transmitted prior to non-URLLC packet transmission. In this case, the base station can proceed with scheduling the regular traffic in the DL time/frequency resources d2 as the non-URLCC traffic can afford longer delays. The regular UEs providing eMBB services can be scheduled for a much longer duration (comprising multiple TTIs) compared to the scheduling duration required for URLLC services. In case a URLLC packet arrives in between of a scheduled eMBBs packet, the URLLC packet can take the portion it requires by using puncturing techniques.

Also shown in FIG. 7 is the base station transmitting a non-URLLC packet to UE1 (mobile device 21 of FIG. 1) in DL resource d4 in time interval ti1, and UE1 transmitting an ACK (ack2) to the base station in UL resource u4 (which is not reserved for D2D communication) in time interval ti4. In the example of FIG. 7, UE1 does not retransmit the URLLC packet transmitted by sensor S1, because UE1 was receiving the non-URLLC packet from the base station. In another example, UE1 might additionally or alternatively have retransmitted the URLLC packet transmitted by sensor S1.

Figure 8:
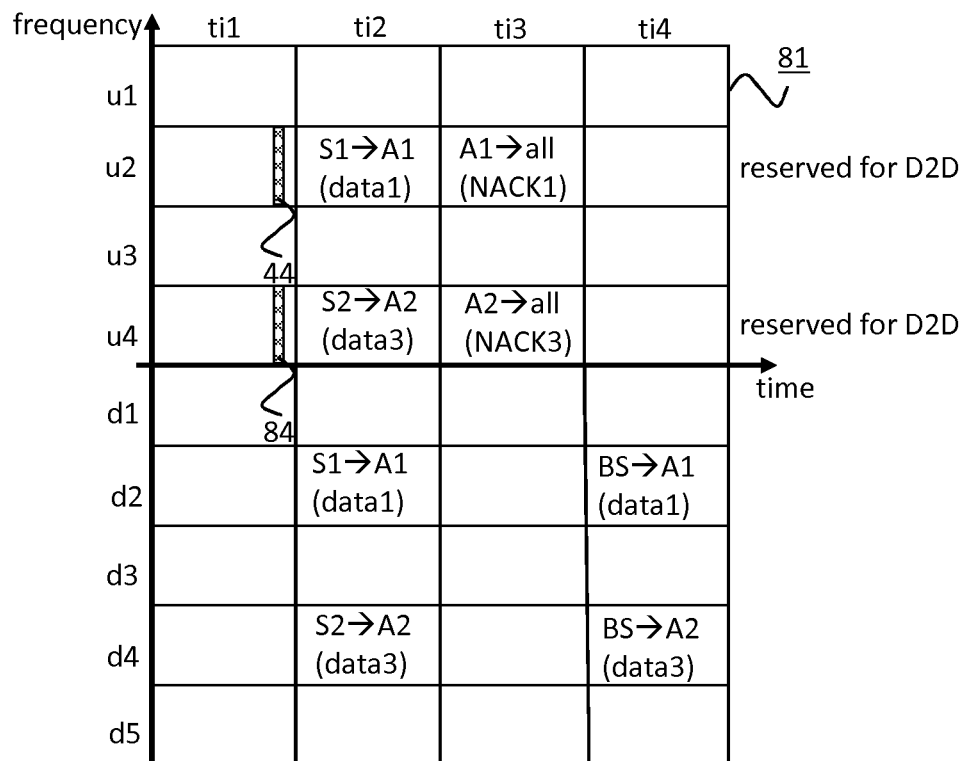
FIG. 8 depicts a second example of the methods of the invention performing transmissions and receptions in certain time intervals and frequency resources.

FIG. 8 depicts in table 81 a second example of the methods of the invention performing transmissions and receptions in certain time intervals and frequency resources.

In the embodiment of FIG. 8, two sensors transmit URLLC data at the same time in different frequency resources. UL frequency resource u2 and DL frequency resource d2 have been assigned to sensor S1 and UL frequency resource u4 and DL frequency resource d4 have been assigned to sensor S2.

Sensor S2 transmits an URLLC preamble 84 in frequency resource u4 in time interval ti1 and then transmits a first copy or portion of an URLLC packet (data3) in frequency resource u4 in time interval ti2 and a second copy or portion of the URLLC packet in frequency resource d4 in time interval ti2 to actuator A2. When the base station detects transmission of a NACK by actuator A2 in UL frequency resource u4 time interval ti3, it retransmits the URLLC packet (data3) to actuator A2. Another difference with the example of FIG. 7 is that the sensors S1 and S2 do not receive the broadcast NACKs in time interval ti3 and therefore do not retransmit the URLLC packet in time interval ti4. Only the base station retransmits the URLLC packet in time interval ti4.

Figure 9:
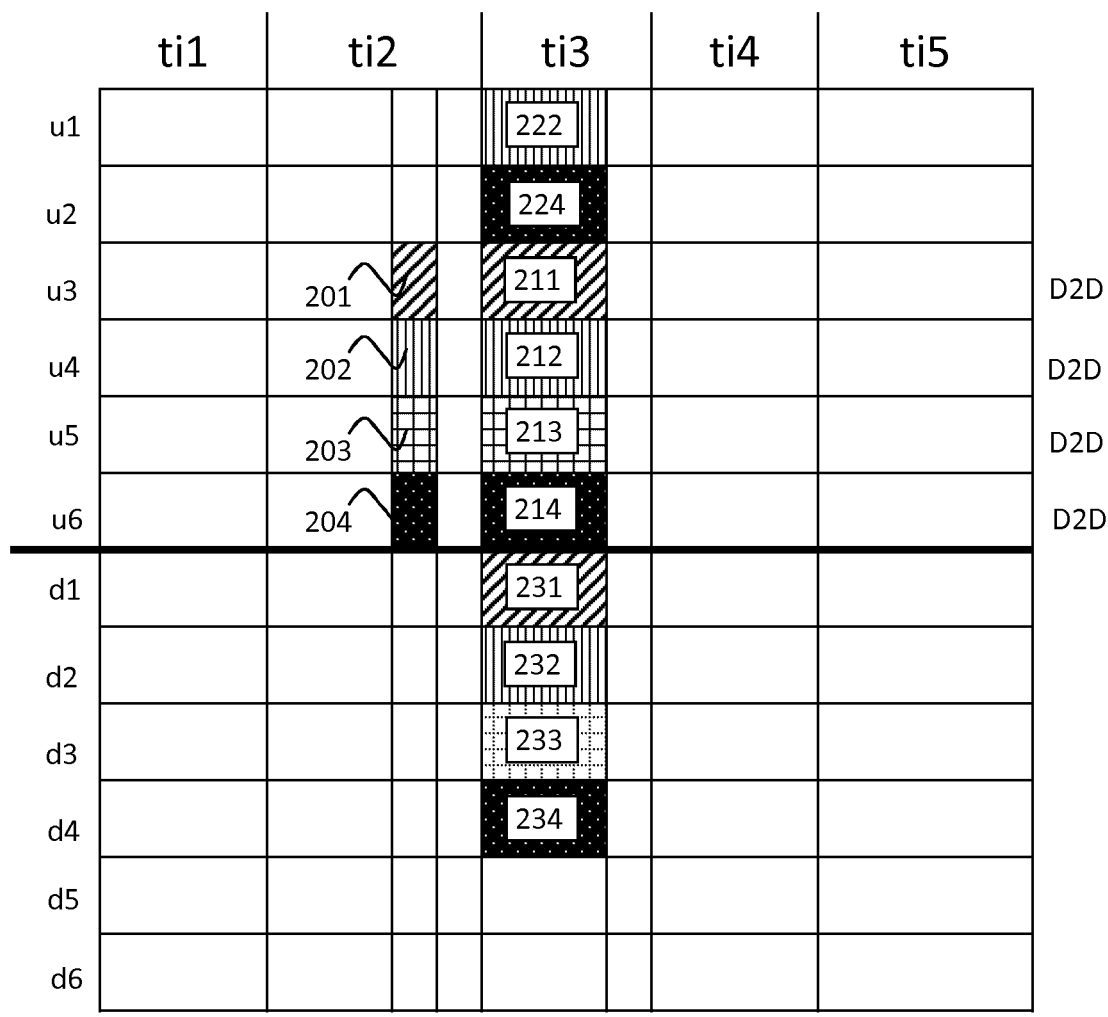
FIG. 9 depicts a third example of the methods of the invention performing transmissions and receptions in certain time intervals and frequency resources.

FIG. 9 depicts a third example of the methods of the invention performing transmissions and receptions in certain time intervals and frequency resources. FIG. 9 shows four D2D pairs having URLLC transmissions at the same time, namely (S1,A1) to (S4,A4). If the same UL and/or DL resources are used by these D2D pairs then packet collision and interference might occur, resulting in corrupted data and longer delays. This problem may be mitigated by having separate UL (and DL) resources for (S1,A1) to (S4,A4) that are non-overlapping in order to prevent that the D2D pairs collide with their URLLC packet transmissions.

The allocation of the non-overlapping resource pools for the pairs (S1,A1) to (S4,A4) is done via signalling from the base station and using their Radio Network Temporary Identifier (RNTI). Thus, a message assigning one or more frequency resources to the sensors S1 to S4 is received by the sensors S1 to S4 and if a sensor does not have an URLLC packet, it listens for transmission of the preamble on at least one of the one or more assigned frequency resources and/or on an anchor frequency resource (which may be an assigned frequency resource). If other D2D pairs exist in the coverage area of the base station and they do not cause significant interference to the (S1,A1) to (S4,A4) pairs, then their resource might be re-used.

In order to avoid packet collisions/interference between the different D2D pairs, the amount of non-overlapping UL (and DL) resources should match the number of D2D pairs aiming at simultaneous URLLC transmission. The base station should monitor the traffic conditions and then allocate more resources or release some of the allocated resources depending on the number of simultaneously active D2D URLLC pairs in order to avoid resource reservation overhead.

Further, in case of multiple simultaneous URLLC D2D transmissions the solutions should also consider the transmission of the preamble and its mapping to the UL and DL resources. For the simultaneous preamble transmissions for the URLLC D2D pairs there are two options:

The preambles are transmitted in the same UL resource (a kind of anchor UL resource) in such a way that they can be distinguished by the receivers (base station or other terminals in the surrounding). For example, preamble transmissions can be the Zadoff-Chu sequences (see https://en.wikipedia.org/wiki/Zadoff-Chu_sequence) or sending a coded version of a preamble index. For example, a 8 bit preamble index that is coded such that overlapping transmissions can be distinguished by the receivers. In this case, there could be up to $2^8=256$ different preamble indexes transmitted simultaneously.

The preambles are transmitted in non-overlapping UL frequency resources, as shown in FIG. 9, where four different D2D URLLC pairs are assumed to transmit simultaneously. At time interval ti1 each D2D pair can use its own UL resource (e.g. which UL resource to use is based on its RNTI as signalled by the base station) for transmitting its preamble 201-204. Then, in the following time interval ti3, the actual D2D URLLC data transmission takes place on the associated UL and DL resources as agreed between the terminals and the base station (i.e. this is pre-configured).

In the embodiment of FIG. 9, two of the UEs transmit a third copy or third portion of the URLLC data in a third frequency resource in the time interval ti3. The first frequency resource and the third frequency resource in which these UEs transmit their URLLC data are normally dedicated to transmissions from client devices to base station i.e. an uplink frequency resource) and the second frequency resource in which these UEs transmit their URLLC data is normally dedicated to transmissions from base station to client devices (i.e. a downlink frequency resource).

In the example of FIG. 9, a first UE transmits its URLLC data in frequency/time resources 211 (D2D UL) and 231 (regular DL), a second UE transmits its URLLC data in frequency/time resources 212 (D2D UL), 222 (regular UL) and 232 (regular DL), a third UE transmits its URLLC data in frequency/time resources 213 (D2D UL) and 233 (regular DL), and a fourth UE transmits its URLLC data in frequency/time resources 214 (D2D UL), 224 (regular UL) and 234 (regular DL). The preambles 201-204 are transmitted in the D2D uplink frequency resources (u3-u6).

The preambles transmitted in time interval ti2 also indicate which UL and DL resources will be used (as pre-configured in agreement with the base station) in the time interval ti3 for the actual URLLC data transmission. The frequency resources u1 and u2 might be shared among D2D and no-D2D types of devices. In such cases, the non D2D users will listens to the mapped D2D resources (e.g. in FIG. 9 these are u4 and u6) for possible preamble transmission before transmitting their packets in the UL resources u1 and u2.

In the embodiment of FIG. 9, the preamble identifies assigned frequency resources. This is beneficial if other devices know on which frequency resource to listen for preambles, but do not know which other frequency resources will be used to transmit the URLLC data in the succeeding time interval. Alternatively, other devices might listen to assignment broadcasts by the base station.

The base station listens on all D2D reserved UL resources (e.g. u3 to u6 in FIG. 9) in which a preamble can be transmitted in time interval ti2 in order to detect the announcement (in the form of a preamble) of the URLLC data transmission in time interval ti3. The D2D capable UEs without URLLC data listen for a preamble on the D2D reserved UL resource on which they would transmit a preamble themselves (assigned to them by the base station). The non-D2D UEs listen for a preamble on the D2D reserved UL resource that is paired to a non-D2D UL resource on which they would transmit data. Information on which channels are paired may be broadcast by the base station.

With regard to the data, in time interval ti3, the D2D recipient (e.g. A1 to A4 in FIG. 9) listens only on the mapped UL and DL resources in which the transmitting D2D device will transmit the URLLC data (e.g. actuator A2 listens on frequency resources 212,222 and 232), while the base stations can listen to either all possible mapped UL and DL resources or some of these frequency resources (e.g. one or more of frequency resources 211-234) in order to be able to receive the data correctly and if needed retransmit it later as explained below. The inactive surrounding UEs listen to all or some of the frequency resources in which they would transmit their own data or frequency resources paired with these frequency resources in order to be able to receive the data correctly and if needed retransmit it later as explained below.

Figure 10:
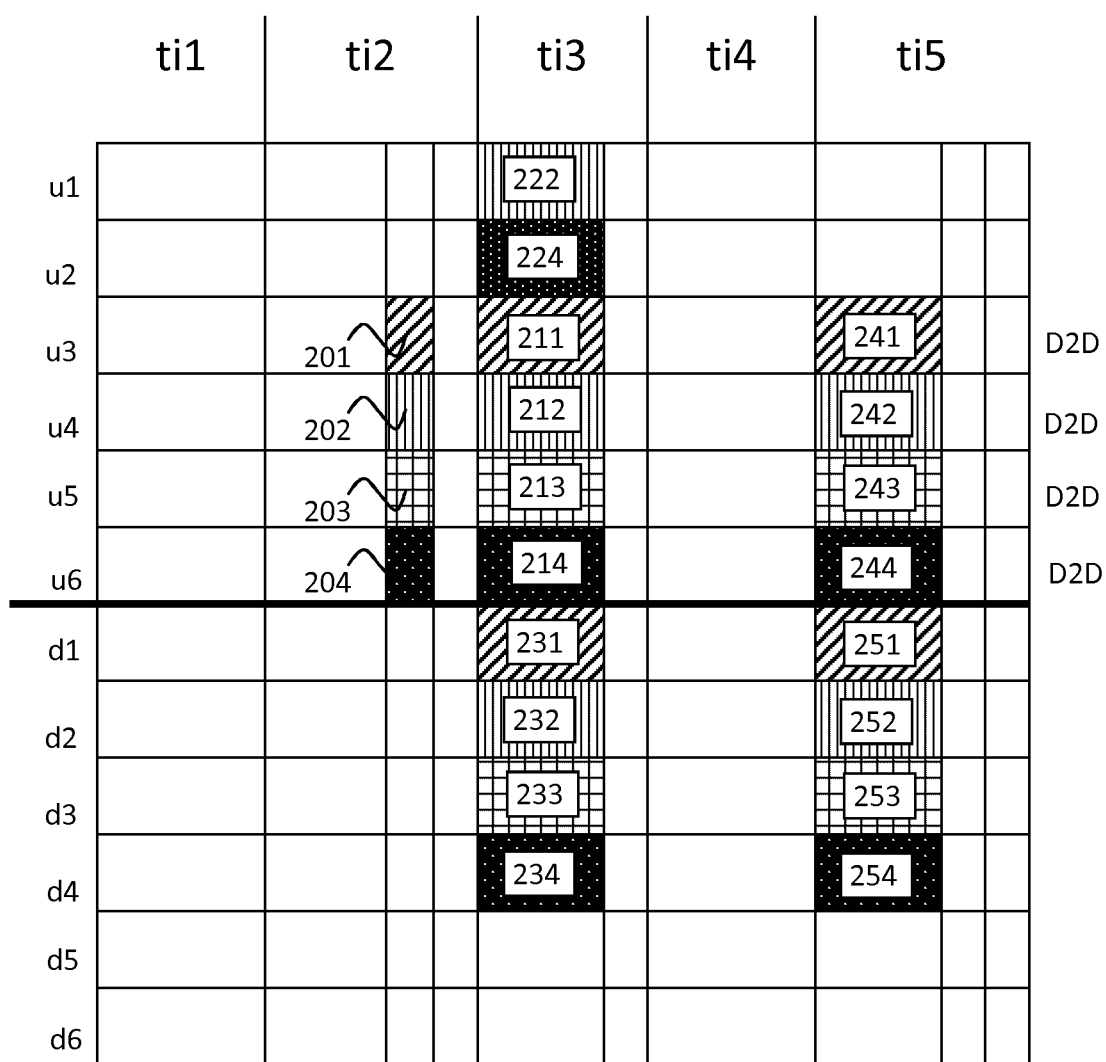
FIG. 10 depicts a fourth example of the methods of the invention performing transmissions and receptions in certain time intervals and frequency resources.

FIG. 10 depicts a fourth example of the methods of the invention performing transmissions and receptions in certain time intervals and frequency resources. FIG. 10 shows a situation in which data is retransmitted and there are multiple simultaneous URLLC data transmissions. After the data transmission in time interval ti3 and if the recipient has sent a broadcast NACK in time interval ti4 (because it received corrupted data) for the retransmissions, the data is retransmitted twice:

1. the base station retransmits the URLLC data packets (if received correctly by the base station in time interval ti3) in the same DL resources d1-d4 in time interval ti5 (frequency/time resources 251-254) as in time interval ti3 (frequency/time resources 231-234) and
2. all surrounding inactive UEs (e.g. mobile devices UE1-UE4) that correctly received the transmitted URLLC data in time interval ti3 retransmit the URLLC data in the same UL resources u3-u6 (frequency/time resources 241-244) in time interval ti5 as in time interval ti3 (frequency/time resources 211-214). A non-D2D device may as an exception be allowed to retransmit the URLLC data in a frequency resource dedicated to D2D, because this retransmission is not intended for the base station, but for a D2D device.

Figure 11:
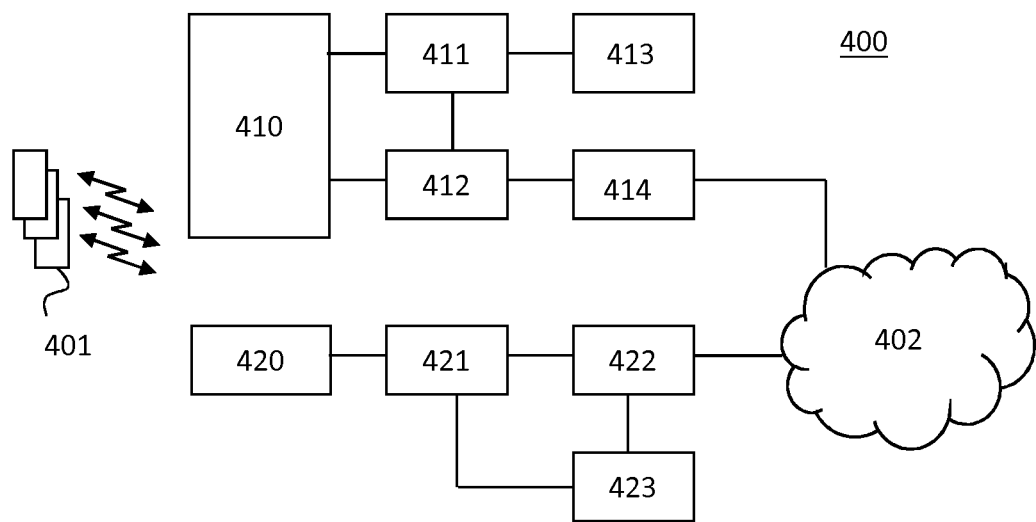
FIG. 11 is a block diagram of an exemplary cellular telecommunication system used in an embodiment of the device and the system of the invention.

In the telecommunications system 400 of FIG. 11, three generations of networks are schematically depicted together for purposes of brevity. A more detailed description of the architecture and overview can be found in 3GPP Technical Specification TS 23.002 'Network Architecture' which is included in the present application by reference in its entirety. Other types of cellular telecommunication system can alternatively or additionally be used, e.g. a 5G cellular telecommunication system.

The lower branch of FIG. 11 represents a GSM/GPRS or UMTS network.

For a GSM/GPRS network, a radio access network (RAN) system 420 comprises a plurality of nodes, including base stations (combination of a BSC and a BTS), not shown individually in FIG. 11. The core network system comprises a Gateway GPRS Support Node 422 (GGSN), a Serving GPRS Support Node 421 (SGSN, for GPRS) or Mobile Switching Centre (MSC, for GSM, not shown in FIG. 22) and a Home Location Register 423 (HLR). The HLR 423 contains subscription information for user devices 401, e.g. mobile stations MS.

For a UMTS radio access network (UTRAN), the radio access network system 420 also comprises a Radio Network Controller (RNC) connected to a plurality of base stations (NodeBs), also not shown individually in FIG. 11. In the core network system, the GGSN 422 and the SGSN 421/MSC are connected to the HLR 423 that contains subscription information of the user devices 401, e.g. user equipment UE.

The upper branch of the telecommunications system in FIG. 22 represents a 4G network, commonly indicated as Long Term Evolution (LTE) system or Evolved Packet System (EPS).

The radio access network system 410 (E-UTRAN) of the EPS, comprises base stations (evolved NodeBs, eNodeBs or eNBs), not shown individually in FIG. 11, providing cellular wireless access for a user device 401, e.g. user equipment UE. The core network system comprises a PDN Gateway (P-GW) 414 and a Serving Gateway 412 (S-GW). The E-UTRAN 410 of the EPS is connected to the S-GW 412 via a packet network. The S-GW 412 is connected to a Home Subscriber Server HSS 413 and a Mobility Management Entity MME 411 for signalling purposes. The HSS 413 includes a Subscription Profile Repository SPR for user devices 401.

For GPRS, UMTS and LTE systems, the core network system is generally connected to a further packet network 402, e.g. the Internet.

Further information of the general architecture of an EPS network can be found in 3GPP Technical Specification TS 23.401 'GPRS enhancements for Evolved Universal Terrestrial Radio Access Network (E-UTRAN) access'.

Figure 12:
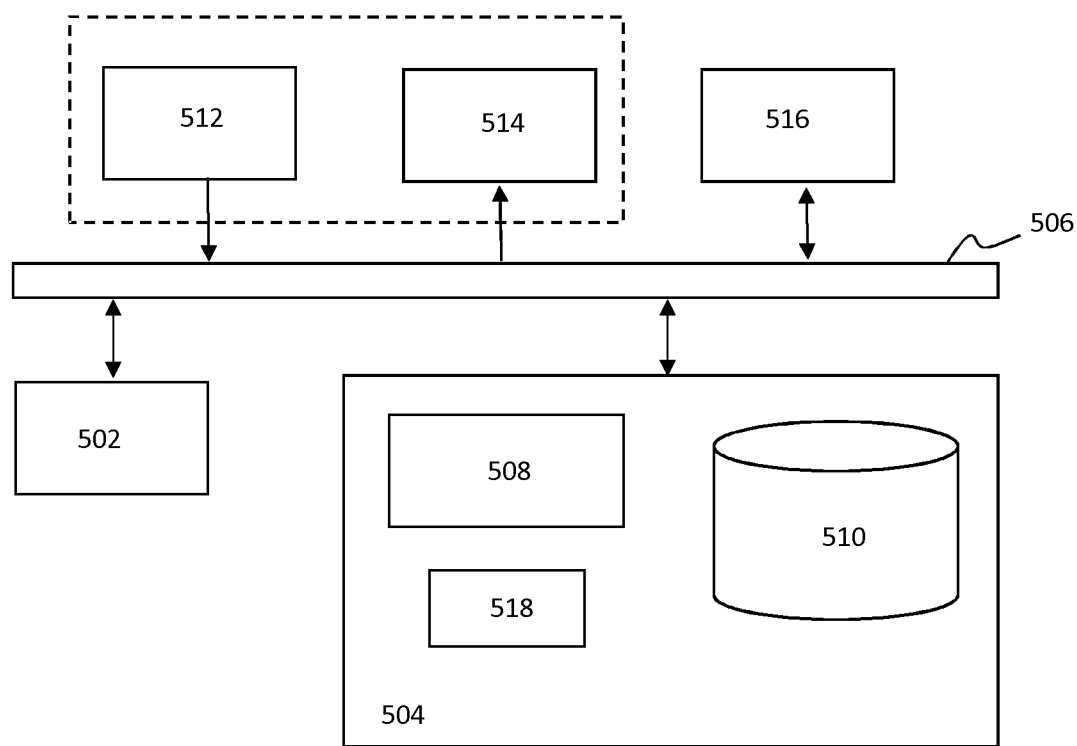
FIG. 12 is a block diagram of an exemplary data processing system for performing the methods of the invention.

FIG. 12 depicts a block diagram illustrating an exemplary data processing system that may perform the methods as described with reference to FIGS. 2 to 5.

As shown in FIG. 12, the data processing system 500 may include at least one processor 502 coupled to memory elements 504 through a system bus 506. As such, the data processing system may store program code within memory elements 504. Further, the processor 502 may execute the program code accessed from the memory elements 504 via a system bus 506. In one aspect, the data processing system may be implemented as a computer that is suitable for storing and/or executing program code. It should be appreciated, however, that the data processing system 500 may be implemented in the form of any system including a processor and a memory that is capable of performing the functions described within this specification.

The memory elements 504 may include one or more physical memory devices such as, for example, local memory 508 and one or more bulk storage devices 510. The local memory may refer to random access memory or other non-persistent memory device(s) generally used during actual execution of the program code. A bulk storage device may be implemented as a hard drive or other persistent data storage device. The processing system 500 may also include one or more cache memories (not shown) that provide temporary storage of at least some program code in order to reduce the number of times program code must be retrieved from the bulk storage device 510 during execution.

Input/output (I/O) devices depicted as an input device 512 and an output device 514 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 12 with a dashed line surrounding the input device 512 and the output device 514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 516 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 500, and a data transmitter for transmitting data from the data processing system 500 to said systems, devices and/or networks. Modems, cable modems, and Ethernet cards are examples of different types of network adapter that may be used with the data processing system 500.

As pictured in FIG. 12, the memory elements 504 may store an application 518. In various embodiments, the application 518 may be stored in the local memory 508, he one or more bulk storage devices 510, or separate from the local memory and the bulk storage devices. It should be appreciated that the data processing system 500 may further execute an operating system (not shown in FIG. 12) that can facilitate execution of the application 518. The application 518, being implemented in the form of executable program code, can be executed by the data processing system 500, e.g., by the processor 502. Responsive to executing the application, the data processing system 500 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 502 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A device for transmitting a preamble and data, at least one transmitter; and
at least one processor configured to:
use said at least one transmitter to transmit a preamble in a first time interval in a first frequency resource,
use said at least one transmitter to transmit a first portion or a first copy of data in said first frequency resource in a second time interval, said second time interval succeeding said first time interval, and
use said at least one transmitter to transmit a second portion or second copy of said data in a second frequency resource in said second time interval, said second frequency resource being separate from said first frequency resource.

2. A device as claimed in claim 1, wherein said first frequency resource is allocated to device-to-device communication and said second frequency resource is not allocated to device-to-device communication.

3. A device as claimed in claim 1, wherein said at least one processor is configured to classify said data in one of a plurality of classes and use said at least one transmitter to transmit said preamble in dependence on said determined class of said data.

4. A device as claimed in claim 1, wherein said intervals each comprise a first period for transmitting data, a second period for transmitting said preamble following said first period and a guard period following said second period.

5. A device as claimed in claim 1, wherein said preamble identifies at least said first frequency resource and said second frequency resource.

6. A device as claimed in claim 1, wherein said at least one processor is configured to use said at least one transmitter to transmit a third copy or third portion of said data in a third frequency resource in said second time interval.

7. A device as claimed in claim 1, wherein said preamble consumes 15% or less of said first time interval.

8. A device as claimed in claim 1, wherein said first frequency resource and/or said third frequency resource is normally dedicated to transmissions from client devices to base station and said second frequency resource is normally dedicated to transmissions from base station to client devices.

9. A device as claimed in claim 1, wherein said first frequency resource and said second frequency resource are normally dedicated to transmissions from client devices to base station.

10. A system for receiving a preamble, comprising:
at least one receiver;
at least one transmitter; and
at least one processor configured to:
use said at least one receiver to listen for transmission of a preamble,
use said at least one transmitter to transmit data in a second time interval succeeding a first time interval upon determining that said preamble was not received in said first time interval, and
refrain from transmitting data in said second time interval upon determining that said preamble was received in said first time interval.

11. A system as claimed in claim 10, wherein said preamble identifies said first frequency resource and said third frequency resource and said at least one processor is configured to refrain from transmitting data in said second time interval in third frequency resource upon determining that said preamble was received in said first time interval.

12. A system as claimed in claim 10, wherein said at least one processor is configured to use said at least one receiver to receive a message from a base station, said message assigning one or more frequency resources to said system, and use said at least one receiver to listen for transmission of said preamble on at least one of said one or more assigned frequency resources.

13. A method of transmitting a preamble, comprising:
transmitting a preamble in a first time interval in a first frequency resource;
transmitting a first portion or a first copy of data in said first frequency resource in a second time interval, said second time interval succeeding said first time interval; and
transmitting a second portion or second copy of said data in a second frequency resource in said second time interval, said second frequency resource being separate from said first frequency resource.

14. A computer program or suite of computer programs comprising at least one software code portion or a computer program product storing at least one software code portion, the software code portion, when run on a computer system, being configured for performing the method of claim 13.

15. A method of receiving a preamble, comprising:
listening for transmission of a preamble;
transmitting data in a second time interval succeeding a first time interval upon determining that said preamble was not received in said first time interval; and
refraining from transmitting data in said second time interval upon determining that said preamble was received in said first time interval.

* * * * *